United States Patent [19]

Poklemba et al.

[11] Patent Number: 4,472,817
[45] Date of Patent: Sep. 18, 1984

[54] NON-PLL CONCURRENT CARRIER CLOCK SYNCHRONIZATION

[75] Inventors: John J. Poklemba, Ijamsville; Chester J. Wolejsza, Gaithersburg, both of Md.

[73] Assignee: Communications Satellite Corporation, Washington, D.C.

[21] Appl. No.: 406,149

[22] Filed: Aug. 9, 1982

[51] Int. Cl.³ ............................................. H04L 27/04
[52] U.S. Cl. ...................................... 375/97; 375/113; 329/50; 329/100
[58] Field of Search ....................... 375/77, 81, 85, 86, 375/106, 97, 113; 455/202, 208, 209; 329/50, 122, 124, 100

[56] References Cited

U.S. PATENT DOCUMENTS

| | | | |
|---|---|---|---|
| 3,818,347 | 6/1974 | Holsinger | 375/94 |
| 3,962,637 | 6/1976 | Motley et al. | 375/14 |
| 4,004,226 | 1/1977 | Qureshi et al. | 375/15 |
| 4,079,329 | 3/1978 | England | 375/81 |
| 4,085,378 | 4/1978 | Ryan et al. | 375/81 |
| 4,158,105 | 6/1979 | Otani et al. | 329/110 |
| 4,215,239 | 7/1980 | Gordy | 375/114 |
| 4,249,252 | 2/1981 | Hofmeister | 375/106 |
| 4,295,222 | 10/1981 | Van Uffelen | 375/106 |
| 4,344,178 | 8/1982 | Waters | 375/81 |
| 4,384,357 | 5/1983 | de Budda et al. | 375/81 |

Primary Examiner—Robert L. Griffin
Assistant Examiner—Stephen Chin
Attorney, Agent, or Firm—Sughrue, Mion, Zinn, Macpeak & Seas

[57] ABSTRACT

Concurrent carrier and clock synchronization are derived from an input signal in interdependent loops without the use of phase look loop (PLL) circuitry in order to improve operation at higher bit rates. An acquisition detection signal is generated only in response to predetermined minimum errors in both the received signal amplitude and the recovered carrier phase.

8 Claims, 3 Drawing Figures

NON-PLL CONCURRENT CARRIER & CLOCK SYNCHRONIZATION

FIG. 1 NON-PLL CONCURRENT CARRIER & CLOCK SYNCHRONIZATION

FIG. 2
ACQUISITION DETECTION
TOLERANCE MECHANISM
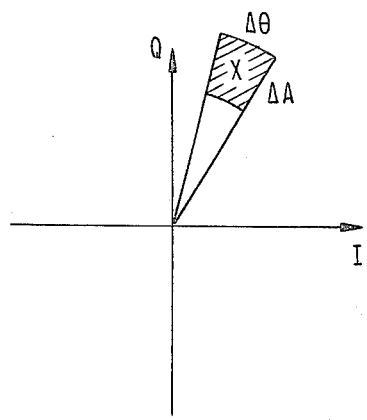
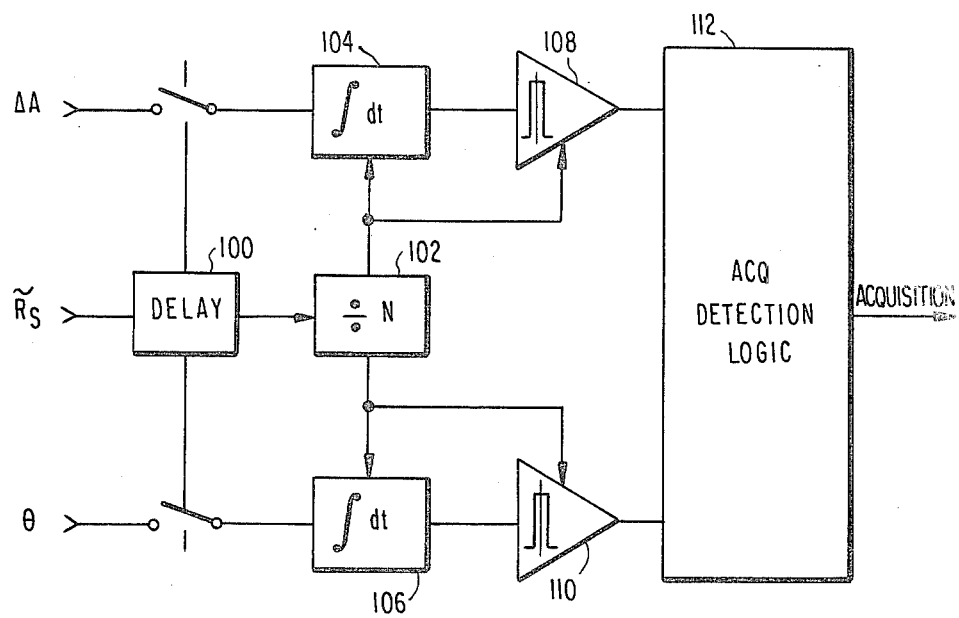
FIG. 3  ACQUISITION DETECTION BLOCK DIAGRAM

NON-PLL CONCURRENT CARRIER CLOCK SYNCHRONIZATION

BACKGROUND OF THE INVENTION

This application is an improvement in the invention disclosed in copending and commonly assigned application Ser. No. 175,479 U.S. Pat. No. 4,419,759 entitled "Concurrent Carrier Clock Synchronization for Data Transmission System", filed Aug. 5, 1980. The subject matter of said application No. 175,479 is incorporated by reference as if fully and completely disclosed herein.

The present invention is directed to the concurrent carrier recovery and clock synchronization from a double side band-suppressed carrier (DSB-SC) signal without the use of phase-lock loops (PLL's) for carrier or clock recovery.

In data transmission systems, information is transmitted in the form of modulated wave forms which can only be demodulated with the help of a coherent carrier reference signal and a clock signal synchronized to the symbol timing of the modulated waveform. A number of different techniques have been used for recovering the carrier and clock from the received signal, including both series and parallel-type recovery circuits. In a series-type recovery circuit, a coherent carrier is first established in order to remove the data from the received signal, and the data is then used to recover a synchronized clock. The time required to perform these operations successively, however, is generally unacceptable in systems operating in the burst mode.

Parellel-type systems are somewhat faster and require less "overhead" to be transmitted for the purpose of deriving carrier phase and symbol timing synchronization. However, parallel-type recovery systems suffer from their own disadvantages such as reduced S/N, increased steady state phase jitter and error rate and acquisition times which are also not entirely satisfactory.

An improved type of concurrent carrier and clock synchronization technique is disclosed in said copending application No. 175,479 wherein PLLs are used in the respective carrier and clock recovery networks, and the PLLs are cross-coupled in an interdependent recovery structure to enable a more effective clock and carrier regeneration. While this system provides significant advantages with respect to previous techniques, it does employ PLLs in its recovery networks. While these may provide a high degree of accuracy, there are regions of initial phase offset which occur frequently enough in incoming bursts in a PSK/TDMA system to render the aquisition period unacceptably long for higher data rates.

SUMMARY OF THE INVENTION

It is therefore an object of this invention to provide a concurrent carrier and clock synchronization (CCS) technique which exhibits more reliable acquisition characteristics under certain conditions at higher data rates.

It is a feature of this invention that a concurrent carrier and clock synchronization system is provided which does not employ phase lock loops in its carrier or clock recovery networks.

Briefly, the concurrent carrier and clock synchronization system according to the present invention includes three interdependent estimation loops coupled with data detection paths, such that gain control, recovered carrier and clock, and data decisions are all accomplished simultaneously. In a carrier synchronization loop, the input IF signal is delayed and phase-shifted to align its modulated envelope with detected data from a respective one of the information channels. Mixers are used to combine the input signal envelope with the data from the respective channel, and the mixer outputs are then differenced to obtain a carrier component. The recovered carrier component is then supplied in phase and quadrature to input mixers for detecting data in the input signal period.

In the clock synchronization loop, the data from each of the channels are multiplied by their respective time derivatives to obtain a clock component which is then provided in phase and quadrature to sample the recovered data in each channel.

In an amplitude estimation loop, the analog data in each channel are multiplied by their detected digital counterparts to obtain a measure of the received energy which can be used for automatic gain control (AGC) purposes as well as to detect acquisition.

BRIEF DESCRIPTION OF THE DRAWINGS

The invention will be more clearly understood from the following description in conjunction with the accompanying drawings, in which:

FIG. 2 is a diagram for explaining the acquisition detection tolerance mechanism; and FIG. 3 is a block diagram illustrating an acquisition detection technique.

DETAILED DESCRIPTION OF THE INVENTION

Figure 1:
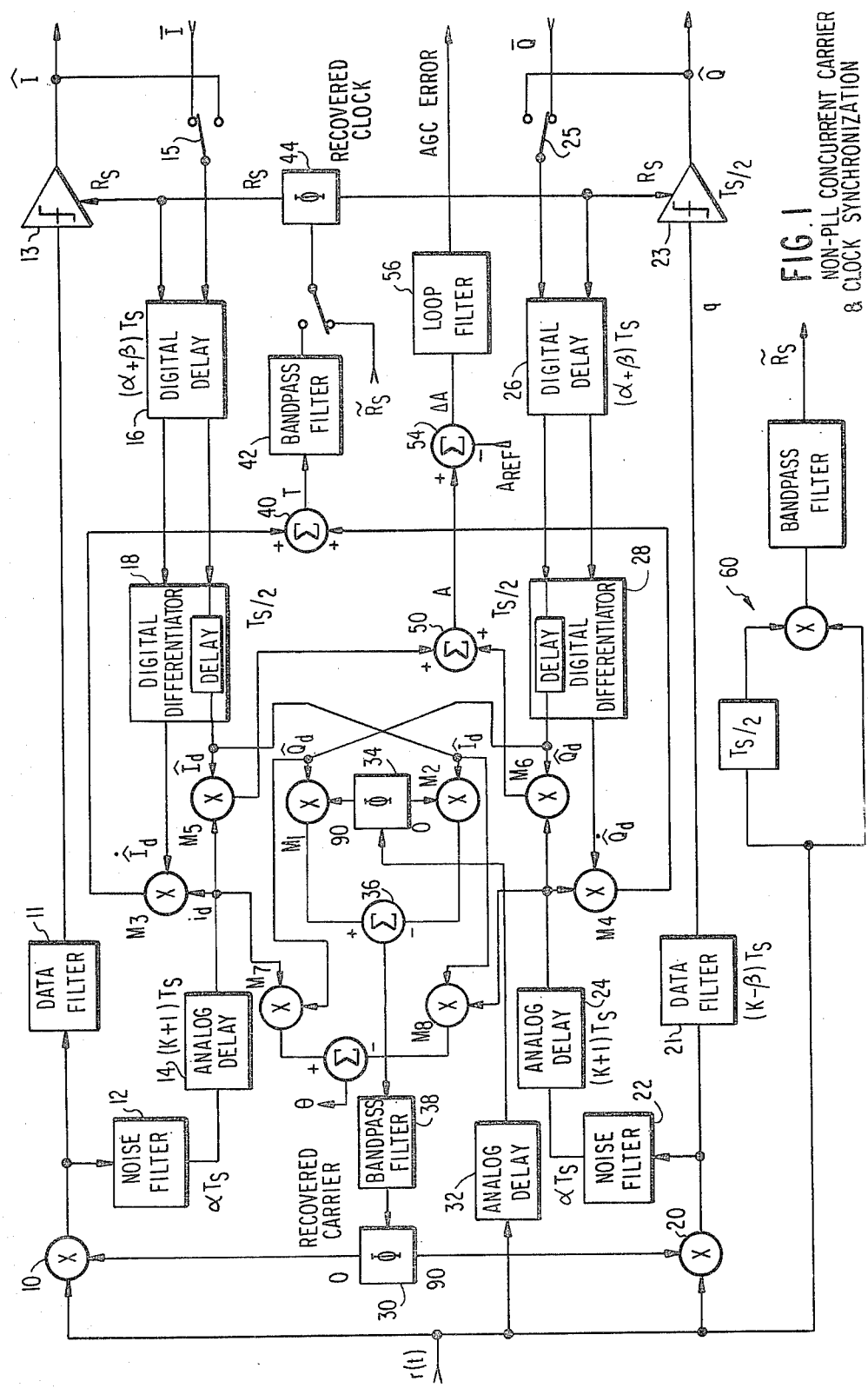
FIG. 1 is a diagram of a non-PLL concurrent carrier and clock synchronization system according to the present invention.

The invention concerns double side bandsuppressed carrier signals and is applicable to most signal formats expressable as amplitude-modulated carriers. As in said copending application No. 175,479, the present description will be given with reference to 4-ary phase-shift keyed signals wherein the received signal r(t) has the form $$r(t) = \sqrt{P} \sum_{k=1}^{N} i_k(t - kT_s)\cos(\omega_c t) + q_k(t - kT_s)\sin(\omega_c t).$$

The modulating waveforms $i_k(t)$ and $q_k(t)$ represent filtered bipolar energy data and they enable one of four possible signals to be sent over a symbol time interval $T_s$. The entire sequence length is $NT_s$. By setting $q_k(t)$ to 0, the system degenerates to binary transmission. In general, the invention is applicable to any M-ary signalling with $i_k(t)$ and $q_k(t)$ corresponding to an X-Y vector component representation of the desired message.

A block diagram of a non-PLL concurrent carrier and clock synchronization system according to the present invention is illustrated in FIG. 1 and includes a carrier synchronization loop, a clock synchronization loop and an amplitude estimation loop. The interdependent operation of these three loops will be described first with respect to steady state operation and then with respect to operation during the acquisition period.

During steady state operation of the carrier synchronization loop, an input signal r(t) is provided in parallel to the mixers 10 and 20 where it is mixed with in-phase and quadrature carriers from the phase shifter 30 to obtain baseband data signals for each of the two channels. The baseband data signal output from the mixer 10 is supplied through a data filter 11 to a comparator/sampler 13 where it is sampled by a recovered clock $R_s$. The data estimate resulting from this sampling and comparing is provided through switch 15 to a digital delay 16 of a type well known in the art, and thence to a digital differentiator 18 of type which is also well known. The digital differentiator 18 provides a pair of outputs, one of which is the I-channel data estimate $\hat{I}_d$ and the other of which is the time derivative of the I-channel data estimate. The data estimate is fed as an input to the mixer $m_2$.

The alternate channel operates in the same manner with the baseband data signal output from the mixer 20 being provided through a data filter 21 to a comparator/sampler 23, and the sampled data being fed back through switch 25, digital delay 26 and digital differentiator 28, with the data estimate $Q_d$ output from the digital differentiator 28 being provided as an input to the mixer $m_1$.

The input signal r(t) is provided through analog delay circuit 32 to a 90° phase shifter 34, the phase shifter 34 providing the original input signal inphase to the mixer $m_2$ and phase-shifted by 90° to the mixer $m_1$.

The data filters 11 and 21 in each channel result in a delay of $(K-\beta)T_s$, the comparator/samplers 13 and 23 and the digital differentiators 18 and 28 in each channel all exhibit delays of $T_s/2$, and the digital delays 16 and 26 in each channel exhibit delays of $(\alpha+\beta)T_s$, so that the recovered data estimates reach their respective mixers $m_1$ and $m_2$ with total delays of $(K+\alpha+1)T_s$. Accordingly, the analog delay 32 is designed to provide a delay of $(K+\alpha+1)T_s$, and phase shifting the input signal by 90° in the phase shifter 34 will align its modulated envelope with the Q-channel data estimates $\hat{Q}_d$ which are provided as a second input to the mixer $m_1$. Subtracting the mixer output signals from one another in combiner 36 will result in a signal having a carrier component where all four signal states have been mapped into one, and the S/N of the reconstructed carrier can be enhanced by the bandpass filter 38 which provides the recovered carrier as an input signal to the phase shifter 30.

An important distinction between the carrier recovery loop of the present invention and that in said copending application No. 175,479 is that the present invention provides the input signal r(t) as an input to the mixers $m_1$ and $m_2$, thereby performing a remodulation operation so that the output of combiner 36 will include a carrier component which can be passed through the bandpass filter 38 and used as the recovered carrier. In contrast, in the technique of copending application No. 175,479, the output from a corresponding combiner included a d.c. component which was used as an error signal to drive a voltage controlled oscillator (VCO). A significant advantage resulting from this difference is that the carrier acquisition operation performed by the system according to the present invention is substantially more linear and more easily controllable than the relatively non-linear acquisition performed by a VCO.

During steady state operation of the clock synchronization loop, the I-channel baseband data signal $i_d$ is combined in a mixer $m_3$ with the time derivative of the I-channel data estimates, with the output of the mixer $m_3$ being provided as one input to a combiner 40. Similarly, the Q-channel baseband data signal $q_d$ is multiplied by its time derivative in the mixer $m_4$. The output of each mixer will include a DC term as well as a component at the symbol clock rate, and the summing in the combiner 40 will enhance the S/N of the signal since the noise components in the two channels are orthogonal. The signal at the output of combiner 40 is filtered in a bandpass filter 42 to select the desired clock component and further enhance the S/N, and a phase shifter 44 provides properly phased symbol-rate clocks to the comparator/samplers in the respective channels.

Again, it should be emphasized that an important distinction between the present system and that of copending Ser. No. 175,479 resides in the use of the clock component in the output of combiner 40 as a recovered clock after bandpass filtering in the filter 42, whereas the previous arrangement utilized a substantially d.c. component from the combiner output to drive a VCO, which VCO is disadvantageous due to its non-linear acquisition operation.

The amplitude estimation loop for Automatic Gain Control (AGC) employs the multipliers $m_5$ and $m_6$ which operate in a manner similar to mixers $m_3$ and $m_4$. Instead of receiving the time derivatives as inputs, however, the mixers $m_5$ and $m_6$ receive the recovered data estimates $\hat{I}_d$ and $\hat{Q}_d$, respectively. The summation in combiner 50 again enhances the S/N to achieve an absolute value, or magnitude squared, operation yielding a signal "A" which is a measure of the received energy. For AGC operation, this signal is compared to a reference in the difference amplifier 54, and the difference signal $\Delta A$ can be used to maintain proper signal levels in the receiver. The AGC error signal may preferably be cleaned up by a noise filter 56. This AGC signal can also be used for acquisition detection as will be described in more detail below.

Having described above the operation in steady state, the operation of the circuitry during the acquisition period is relatively easily understood. With no PLLs or associated voltage controlled oscillators (VCOs) employed in the various synchronization loops in the system according to the present invention, no initial estimates of the carrier or clock exist in the demodulator. As a result, data detection feedback is not generated, and the lock-up process stalls. Therefore, in order to initiate acquisition in the system according to the present invention, a preamble consisting of a known data sequence is transmitted ahead of the information bits, a most suitable sequence being "1010 . . .". Since the data bits are known and only their relative timing is uncertain, no data detection is required, and locally generated $\tilde{I}$ and $\tilde{Q}$ can be provided through switches 15 and 25 during this initial acquisition period. These known data estimates can be generated locally in a well known manner with the help of a clock estimate, and the clock estimate can be made available during the initial acquisition period by means of a halfsymbol delay clock recovery path 60 shown in FIG. 1. After acquisition has been achieved, switches 15 and 25 may be switched back to their positions at which the steady state recovered data are fed back.

Since concurrent carrier and clock synchronization is primarily a steady state technique, the acquisition signal which allows normal operation is important. The detection of acquisition and generation of an acquisition signal are generally known, but a technique found by the inventors to be most suitable for the present invention will be described with reference to FIGS. 2 and 3. FIG. 2 illustrates in principle the selection of tolerances for the amplitude and phase variations with respect to the nominal position in the signal space. Suitable circuitry for implementing this procedure is shown in FIG. 3. A symbol rate clock $\bar{R}_s$ is provided through a delay 100 to a divide-by-N circuit 102, where N is any positive integer preferably greater than 1 yet small enough to still allow sufficiently fast response in the acquisition. The delay is such as to position a clock pulse at the maximum S/N point, or eye opening, with sampling pulses from the divider 102 being provided to averaging circuits 104, 106 and associated comparators 108, 110. The amplitude and phase error signals are thus sampled at the symbol rate in accordance with outputs from the delay unit 100 and the integrators 104 and 106 are clocked by the divide-by-N outputs from the divider 102 so that each integrator will average its input signal samples over N symbols. These N-symbol averages are then sampled by respective comparator/samplers 108 and 110, the outputs of which are provided to the acquisition detection logic circuitry 112 to determine whether or not acquisition has occurred.

The phase error $\theta$ in FIG. 3 is derived by mixers $m_7$, $m_8$ and combiner 114 shown in FIG. 1 in a manner similar to the generation of the phase error signal used in copending application No. 175,479 to drive the VCO in the carrier recovery loop.

Samples of the amplitude and phase errors are thus taken at the maximum S/N ratio point, averaged and compared to a threshold. If the smoothed amplitude and phase variations are within acceptable limits, it is determined that acquisition has been achieved. Thus, acquisition will not be declared until all three loops are synchronized. Acquisition detection logic circuitry 112 simply performs a logical combination of the outputs of comparators 108 and 110 in order to determine if acquisition has been achieved, and a suitable internal logic configuration for the circuitry 112 would be obvious to any ordinarily skilled artisan.

While a single embodiment of the invention has been disclosed above, it should be easily appreciated that a number of changes could be made without departing from the spirit and scope of the invention in its most basic form. For example, the data feedback could be analog instead of digital, with appropriate modifications to the differentiators. Further, switching could be performed either softly or abruptly, and the delay networks could be implemented by all-pass filter sections, charge coupled devices, etc. Also, it should again be noted that the invention is applicable to any M-ary signalling system and is not limited to the quaternary system disclosed.

We claim:

1. In an apparatus for deriving concurrent carrier and clock synchronization from a received signal having at least a first carrier modulated with at least a first data signal, said apparatus being of the type including first mixing means for mixing said received signal with a recovered carrier to obtain a baseband signal, carrier recovery means for providing said recovered carrier, data estimate means for sampling said baseband signal in accordance with a recovered clock to obtain data estimates, and clock recovery means for combining said baseband signal and a time derivative of said data estimates to provide said recovered clock, the improvement characterized in that said carrier recovery means comprises:
   second mixing means for mixing said data estimates with said received signal to generate said recovered carrier.

2. In an apparatus for deriving concurrent carrier and clock synchronization from a received signal having at least a first carrier modulated with at least a first data signal, said apparatus being of the type including first mixing means for mixing said received signal with a recovered carrier to obtain a baseband signal, carrier recovery means for providing said recovered carrier, data estimate means for sampling said baseband signal in accordance with a recovered clock to obtain data estimates, and clock recovery means for combining said baseband signal and a time derivative of said data estimates to provide said recovered clock, the improvement characterized in that said clock recovery means comprises:
   clock recovery mixing means for mixing said baseband signal and said time derivative signal to obtain a clock recovery mixing means output signal having an AC component comprising said recovered clock.

3. An apparatus as defined in claim 2, wherein said improvement is further characterized in that said carrier recovery means comprises carrier recovery mixing means for mixing said data estimates with said received signal to generate said recovered carrier.

4. An apparatus as defined in any one of claims 1, 2 or 3, said apparatus being of the type further comprising acquisition detection means for detecting when a carrier and clock synchronized to said received signal have been recovered, the improvement characterized in that said acquisition detection means comprises:
   amplitude signal means for combining said baseband signal and said data estimates to obtain an amplitude signal;
   amplitude error signal generating means for comparing said amplitude signal to a first reference to obtain an amplitude error signal;
   phase error signal generating means for generating a phase error signal corresponding to a phase error between said recovered carrier and said received signal;
   amplitude averaging means for providing an average value of said amplitude error signal;
   phase averaging means for providing an average value of said phase error signal;
   amplitude comparison means for comparing said average amplitude value to a first threshold level;
   phase comparison means for comparing said average phase error signal value to a second threshold level; and
   acquisition detection signal generating means for generating an acquisition detection signal in response to a predetermined combination of outputs from said amplitude and phase comparison means.

5. An apparatus as defined in claim 4, wherein:
   said amplitude averaging means comprises amplitude sampling means for sampling said amplitude error signal in response to an acquisition clock signal and averaging the amplitude error signal samples;
   said amplitude comparison means comprises an amplitude average sampler and comparator for sampling the output of said amplitude averaging means in response to an averaging clock signal to obtain a sampled average and for comparing the sampled average to said first threshold level;
   said phase averaging means comprises phase error sampling means for sampling said phase error signal in response to said acquisition clock and averaging said phase error samples;

said phase sampling means comprises a phase error signal sampler and comparator for sampling the output of said phase averaging means in response to said averaging clock signal; and said acquisition detection means further comprises means for generating said acquisition detection and averaging clock signals.

6. An apparatus as defined in claim 4, wherein said amplitude and phase error averaging means average their respective amplitude error and phase error signals over N symbols of said received signal, said averaging clock signal having a clock rate S/N, where S is the symbol clock rate of said acquisition clock signal.

7. An apparatus as defined in any one of claims 2 or 3, wherein said received signal includes phase and quadrature carriers modulated with first and second data signals, respectively, said first mixing means comprising first and second mixers each receiving said received signal at one input and phase shift means for receiving said recovered carrier from said carrier recovery means and providing phase and quadrature recovered carriers to the other inputs of said first and second mixers, respectively and said data recovery means includes a first sampled comparator clocked by said recovered clock for recovering a first data signal estimate from the output of said first mixer, and a second sampled comparator clocked by said recovered clock for recovering a second data signal estimate from the output of said second mixer, said carrier recovery means including carrier recovery mixing means comprising:

phase shift means for receiving said received signal and providing shifted and unshifted output signals;

a third mixer for combining said second data signal estimate with said shifted output signal from said phase shift means;

a fourth mixer for mixing said first data signal estimate with said unshifted output signal from said phase shift means; and a carrier recovery combiner for combining the outputs from said third and fourth mixers to obtain said recovered carrier.

8. An apparatus as defined in any one of claims 1, 2 or 3, further comprising acquisition detection means for generating an acquisition detection signal when a carrier and clock synchronized to said received signal have been recovered, said apparatus further comprising means for locally generating a clock signal and data estimates, and switch means for selectively providing said locally generated clock signal and data estimates in place of said recovered clock and recovered data estimates during an initial acquisition period until said acquisition detection signal is generated.

* * * * *